(12) United States Patent
Knight

(10) Patent No.: US 9,521,898 B2
(45) Date of Patent: Dec. 20, 2016

(54) SHOWER BRUSH HAVING INTERCHANGEABLE CLEANING ATTACHMENTS

(71) Applicant: Nickholas Knight, Savannah, GA (US)

(72) Inventor: Nickholas Knight, Savannah, GA (US)

( * ) Notice: Subject to any disclaimer, the term of this patent is extended or adjusted under 35 U.S.C. 154(b) by 0 days.

(21) Appl. No.: 14/870,232

(22) Filed: Sep. 30, 2015

(65) Prior Publication Data

US 2016/0088927 A1 Mar. 31, 2016

Related U.S. Application Data

(60) Provisional application No. 62/057,318, filed on Sep. 30, 2014.

(51) Int. Cl.
| | |
|---|---|
| *A46B 11/06* | (2006.01) |
| *A46B 5/02* | (2006.01) |
| *A46B 5/00* | (2006.01) |
| *B25G 1/04* | (2006.01) |
| *A46B 13/02* | (2006.01) |
| *G08C 17/02* | (2006.01) |
| *B05B 1/18* | (2006.01) |
| *A47K 5/12* | (2006.01) |
| *E03C 1/02* | (2006.01) |
| *H04B 1/20* | (2006.01) |

(52) U.S. Cl.
CPC ........... *A46B 11/066* (2013.01); *A46B 5/0095* (2013.01); *A46B 5/02* (2013.01); *A46B 13/023* (2013.01); *A47K 5/12* (2013.01); *B05B 1/18* (2013.01); *B25G 1/04* (2013.01); *E03C 1/025* (2013.01); *G08C 17/02* (2013.01); *H04B 1/202* (2013.01)

(58) Field of Classification Search
CPC ....... A46B 11/066; A46B 5/0095; A46B 5/02; A46B 13/023; A47K 5/12; B05B 1/18; B25G 1/04; E03C 1/025; G08C 17/02
See application file for complete search history.

(56) References Cited

U.S. PATENT DOCUMENTS

| | | |
|---|---|---|
| 3,131,868 A | 5/1964 | Coleman |
| 4,311,404 A | 1/1982 | Kodera |
| 4,812,070 A | 3/1989 | Marty |
| 5,070,552 A | 12/1991 | Gentry et al. |
| 5,316,401 A | 5/1994 | Sears |
| 5,926,868 A | 7/1999 | Bjerke |
| 8,652,078 B2 * | 2/2014 | Lee .................. B05B 1/083 239/102.1 |

(Continued)

*Primary Examiner* — Shay Karls

(57) ABSTRACT

A shower brush that includes an elongated handle connected to a brush head and an interchangeable and detachable cleaning attachments. The interchangeable cleaning attachments include a variety of cleaning surfaces, such as bristles, pads, and loofas and nozzles that dispense soap and water from assemblies within the shower brush. The soap dispensing assembly includes a pump mechanism that dispenses liquid soap housed within a reservoir through nozzles. The water dispensing assembly dispenses water from a faucet or showerhead through water dispensing channels and nozzles on the cleaning attachment. The water flow and pressure may be adjusted via a nozzle adjustment assembly that includes a rotatable shutter. In some embodiments, the shower brush additionally includes a wireless sound system assembly that communicates with electronic devices and plays audio through speakers positioned within the shower brush.

18 Claims, 6 Drawing Sheets

(56) References Cited

U.S. PATENT DOCUMENTS

| | | | | |
|---|---|---|---|---|
| 8,702,018 B1* | 4/2014 | Rivera | ............... | E03C 1/0408 |
| | | | | 137/888 |
| 8,794,543 B2* | 8/2014 | Leber | ............... | B05B 3/04 |
| | | | | 239/381 |
| 9,095,862 B2* | 8/2015 | Hanna | ............... | B05B 1/18 |
| 2008/0156903 A1* | 7/2008 | Leber | ............... | B05B 15/061 |
| | | | | 239/532 |
| 2010/0092231 A1* | 4/2010 | Kao | ............... | A46B 11/0062 |
| | | | | 401/268 |
| 2015/0328646 A1* | 11/2015 | Granger | ............... | B05B 1/185 |
| | | | | 239/548 |

* cited by examiner

SHOWER BRUSH HAVING INTERCHANGEABLE CLEANING ATTACHMENTS

CROSS REFERENCE TO RELATED APPLICATION

This application claims the benefit of U.S. Provisional Application No. 62/057,318 filed on Sep. 30, 2014. The above identified patent application is herein incorporated by reference in its entirety to provide continuity of disclosure.

FIELD OF THE INVENTION

The present invention relates to shower brushes. More specifically, the present invention relates to a shower brush comprising an elongated handle connected to a brush head having detachable and interchangeable cleaning attachments. The present invention further includes a soap dispensing assembly configured to store cleaning solution within a reservoir and dispense the cleaning solution through a plurality of soap dispensing channels disposed in the cleaning attachment. In some embodiments, the present invention comprises a wireless sound system assembly comprising a wireless transceiver configured to communicate with electronic devices and play audio through operably connected to speakers disposed within the shower brush.

BACKGROUND OF THE INVENTION

Presently, baths and showers utilize a variety of handheld cleaning tools that allow individuals to cleanse various parts of their body and other surfaces. These handheld cleaning tools include sponges, loofas, brushes, wash clothes, and other specialized devices. However, these devices occupy a significant amount of space and require significant cost accumulating these products. Further, these cleaning tools suffer from various problems. Such cleaning tools are difficult to hold and manipulate, especially for people who suffer from arthritis and the elderly. Most of these tools also lack sufficient length to reach one's back or lower extremities.

Typically, a non-mechanical shower brush utilize bristles at the end of a handle that are adapted for cleaning or scrubbing various surfaces. A person using such a device would grip the handle of the shower brush and apply the cleansing agents to the desired area prior to or during scrubbing the desired area. Further, a user is then required to alternate between rinsing and washing the area.

Many individuals may desire a more convenient and multipurpose shower brush when cleaning their body while taking a shower or bath. It is desirable to provide a shower brush having a detachable cleaning attachment that may include a variety of cleaning surfaces, such as bristles, pads, and loofas. It is therefore desirable to provide a shower brush that contains a soap dispensing assembly that dispenses soap through channels on the cleaning attachment and a water dispensing assembly that dispenses water through channels and adjustable nozzles on the cleaning attachment. It is therefore desirable to provide a shower brush that extends and retracts thus enabling individuals to reach previously inaccessible areas. In addition, it is desirable for a shower brush to include a wireless speaker assembly that provides a speaker configured to wireless play selected audio therefrom.

SUMMARY OF THE INVENTION

In view of the foregoing disadvantages inherent in the known types of shower brushes now present in the prior art, the present invention provides a new shower brush wherein the same can be utilized for providing a detachable and interchangeable cleaning attachment, a soap dispensing assembly, a water dispensing assembly, and a wireless sound system assembly.

The present invention relates to a shower brush comprising an elongated handle and detachable and interchangeable cleaning attachment. The shower brush comprises a soap dispensing assembly configured to store cleaning solution within a reservoir and dispense the cleaning solution through a plurality of soap dispensing channels and nozzles disposed in the brush head and cleaning attachment.

It is therefore an object of the present invention to provide a new and improved shower brush that has all of the advantages of the prior art and none of the disadvantages.

It is therefore an object of the present invention to provide a shower brush having a detachable cleaning attachment that may include a variety of cleaning surfaces, such as bristles, pads, and loofas.

It is therefore an object of the present invention to provide a shower brush having a soap dispensing assembly that dispenses soap through channels and nozzles on the cleaning attachment and brush head.

It is therefore an object of the present invention to provide shower brush having a water dispensing assembly that dispenses water through channels and adjustable nozzles.

It is another object of the present invention to provide a shower brush that utilizes an extension mechanism on the handle of the shower brush to adjust the linear length of the handle.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
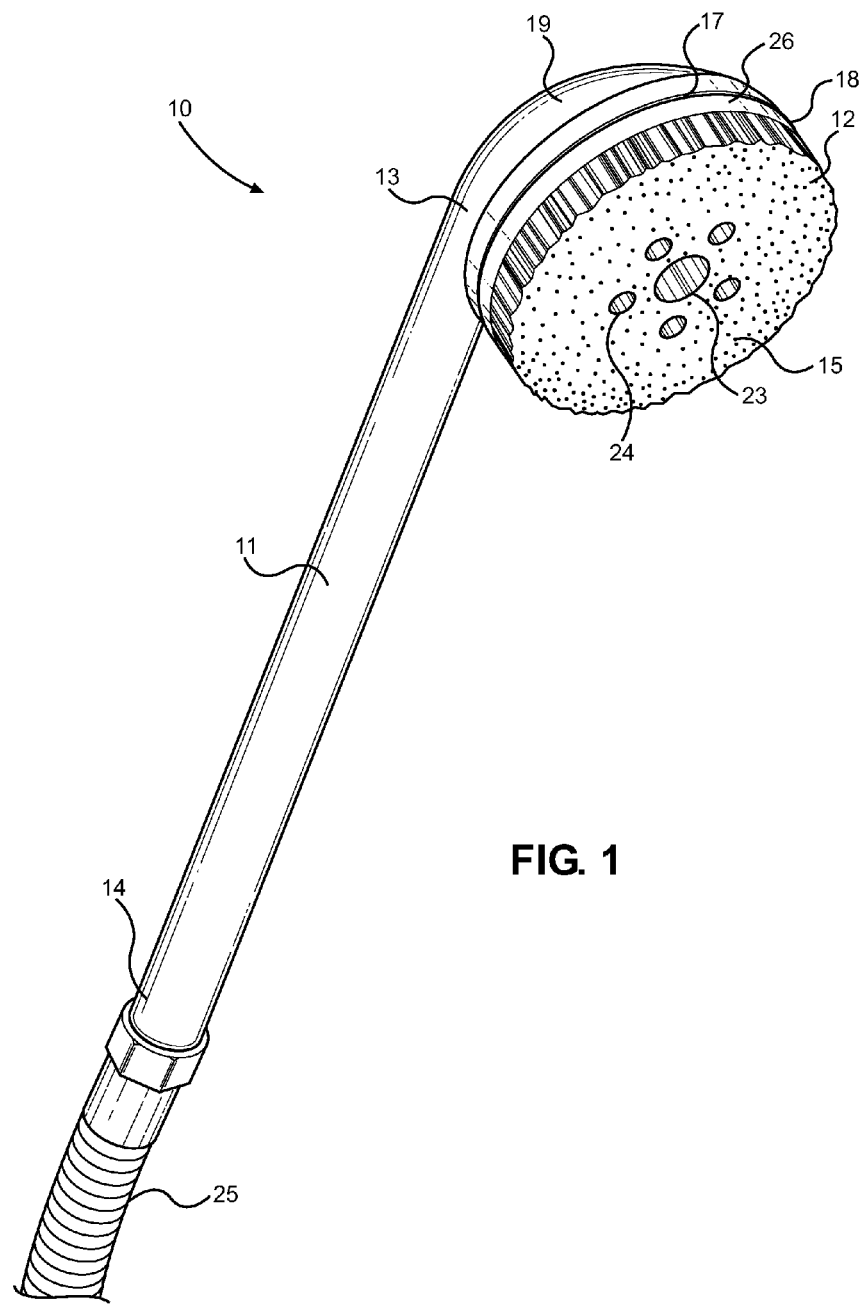
FIG. 1 shows a perspective view of the shower brush.

Reference is made herein to the attached drawings. Like reference numerals are used throughout the drawings to depict like or similar elements of the shower brush. For the purposes of presenting a brief and clear description of the present invention, the preferred embodiment will be discussed as used for helping a user to clean one's body utilizing a detachable and interchangeable cleaning attachment, a soap dispensing assembly, a water dispensing assembly, and a wireless sound system assembly. The figures are intended for representative purposes only and should not be considered to be limiting in any respect.

Referring now to FIG. 1, there is shown a perspective view of the shower brush. The shower brush 10 comprises an elongated handle 11 having a first end 13 and a second end 14, wherein the first end 13 of the elongated handle 11 is connected to a brush head 19. The brush head 19 comprises a cleaning attachment receiving portion configured to removably engage with a detachable cleaning attachment 12. The detachable cleaning attachment 12 comprises a base member 26 having a first side 17 and a second side 18, whereby the first side 17 is configured to engage with the cleaning attachment receiving portion of the elongated handle 11. The first side 17 of the cleaning attachment 12 comprises a plurality of fasteners disposed thereon. In the shown embodiment, the cleaning attachment 12 is cylindrical in shape and the fasteners are configured to affix the first side 17 of the cleaning attachment 12 substantially flush with the cleaning attachment receiving portion of the elongated handle 11.

In the shown embodiment, the second side 18 of the cleaning attachment 12 comprises a plurality of bristles 15 configured for cleaning surfaces, such as one's body, and a plurality of apertures, whereby the plurality of apertures include one or more soap dispensing channels 23 and water dispensing channels 24. In other embodiments, the second side 18 of the cleaning attachment 12 may include a variety of cleaning surfaces, such as bristles, pads, pumice stone, microfiber cloth, goof, exfoliating sponge, loofas, and massage rollers having various textures. In the shown embodiment, the water dispensing channels 24 are disposed in a circular arrangement about the approximate center point of the cleaning attachment 12 and approximately equidistance to adjacent to water dispensing nozzles 24. In the shown embodiment, the second end 14 of the elongated handle 11 is affixed to a flexible hose 25, whereby the flexible hose 25 may also be selectively affixed to a shower head, faucet, or the like. The flexible hose 25 is in fluid communication with the water dispensing channels 24. Thus, water can flow through the handle 11 and the brush head 19, and then through the water dispensing channels 24.

In the shown embodiment, the shower brush 10 comprises a soap dispensing assembly having a soap dispensing channels 23 disposed on the second side 18 of the cleaning attachment 12, whereby the soap dispensing channel 23 is positioned at the approximate center point of the cleaning attachment 12. The soap dispensing channel 23 is in fluid communication with a tube allowing liquid, such as cleaning solution, housed within a reservoir to be dispensed when a pump mechanism is actuated. In this way, the shower brush 10 allows a user to dispense soap directly on a desired area by actuating the pump mechanism on the shower brush 10.

Figure 2:
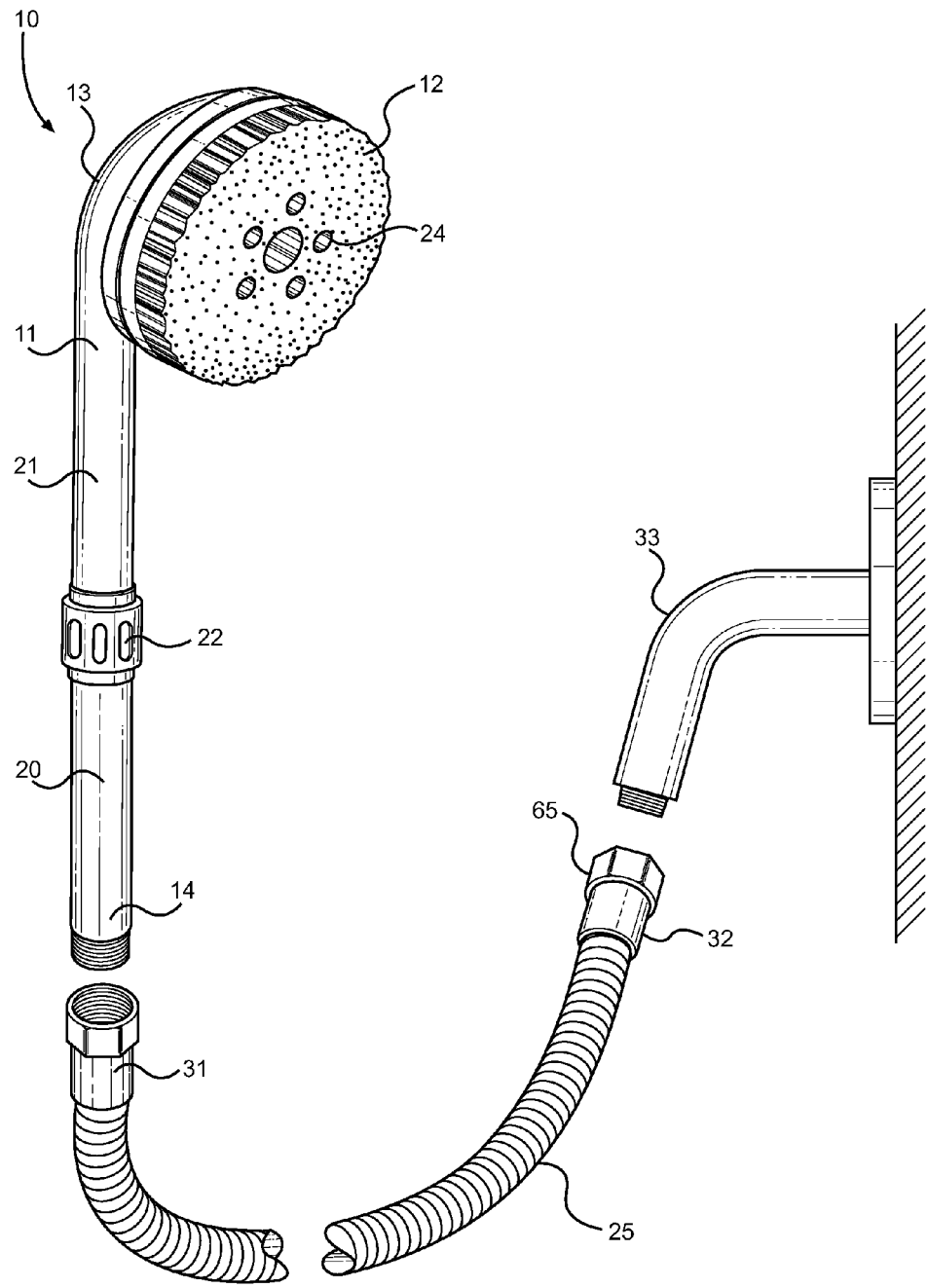
FIG. 2 shows a perspective view of the shower brush affixed to an existing shower head or faucet.

Referring now to FIG. 2, there is a perspective view of the shower brush affixed to an existing shower head or faucet. In the shown embodiment, the flexible hose 25 comprises a first end 31 and a second end 32, wherein the first end 31 of the flexible hose 25 is affixed to the second end 14 of the elongated handle 11 via a fastener. The flexible hose 25 is in fluid communication with the water dispensing channels 24 disposed in the cleaning attachment 12. The second end 32 of the flexible hose 25 comprises an attachment mechanism 65 configured to removably attach the flexible hose 25 to a shower head 33, faucet, and the like to provide water to be dispensed through the water dispensing channels 24. The flexible hose 25 may have a length suitable for use within a bathroom. In the shown embodiment, the attachment mechanism 65 is a threaded connector configured to engage with a corresponding threaded connector.

The elongated handle 11 may comprise one or more elongated sections 20, 21. In the illustrated embodiment, a first elongated section 20 is adjustably secured to a second elongated section 21 so as to allow the elongated handle 11 to extend into an extended configuration and retract into a retracted configuration. This telescopic arrangement of the elongated sections 20, 21 provides for adjustment of the linear length of the elongated handle 11. The first end 13 of the elongated handle 11 comprises the second elongated section 21 and the second end 14 of the elongated handle 11 comprises the first elongated section 20. The elongated sections 20, 21 are fastened to one another via any suitable fastener, such as a twist lock mechanism 22. The twist lock mechanism 22 allows a user to select the desired handle 11 length. In the illustrated embodiment, the elongated sections 20, 21 are tubular members comprising a circular cross-section, however in alternative embodiments, the elongated sections 20, 21 may comprise any suitable cross-sectional shape.

Figure 3:
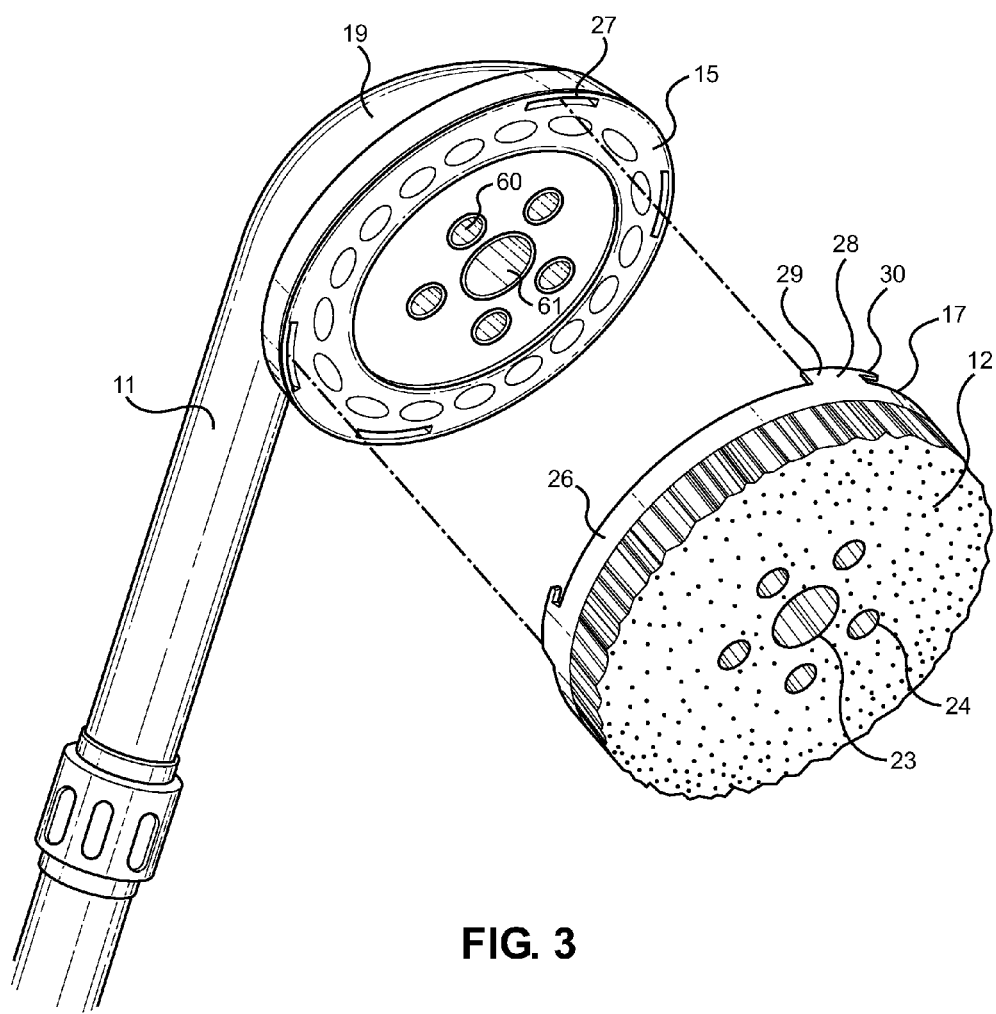
FIG. 3 shows a close-up view of the cleaning attachment detached from the cleaning attachment receiving portion of the brush head.

Referring now to FIG. 3, there is a close-up view of the cleaning attachment detached from the cleaning attachment receiving portion of the brush head. In the shown embodiment, the cleaning attachment 12 is detached from the cleaning attachment receiving portion 15 of the brush head 19. The cleaning attachment 12 comprises a substantially planar base member 26 having a plurality of fasteners disposed on the first side 17 of the cleaning attachment 12 along the periphery thereof. In the shown embodiment, the plurality of fasteners are twist lock fasteners having a male connection mechanism 28 configured to removably secure to corresponding female connection mechanism 27 disposed on the cleaning attachment receiving portion 15 of the brush head 19. In alternative embodiments, the plurality of fasteners may include magnets, clips, screws, and the like.

In the shown embodiment, the male connection mechanism 28 comprises a upstanding member 29 having a projection 30 disposed on one of the sides of the plate 29. In the shown embodiment, the projection 30 on the plurality of male connection mechanisms 28 are disposed on corresponding sides, such that when the cleaning attachment 12 is rotated, the projections 30 are oriented in the same way; either all leading or all trailing. In the shown embodiment, the female connection mechanisms 26 are apertures disposed along the periphery of the cleaning attachment receiving portion 15. In use, the male connection mechanisms 28 are inserted within the female connection mechanisms 26 and twisted in such a way that the projection 30 is leading. In this way, the projection 30 is configured to removably secure the cleaning attachment 12 to the cleaning attachment receiving portion 15 of the brush head 19.

In the shown embodiment, the water dispensing channels 24 comprise a series of aligned apertures configured to facilitate the flow of fluid therethrough, whereby one aperture on the cleaning attachment receiving portion 15 is an inlet, henceforth called a water dispensing nozzles 60, and another aperture is an outlet on the cleaning attachment 12. The water dispensing nozzles 60 are dimensioned to correspond to the dimension of the water dispensing channels 24.

In the shown embodiment, the soap dispensing channels 24 comprise a series of aligned apertures configured to facilitate the flow of fluid therethrough, whereby one aperture on the cleaning attachment receiving portion 15 is an inlet, henceforth called a soap dispensing nozzles 61, and another aperture is an outlet on the cleaning attachment 12.

The soap dispensing nozzles 60 are dimensioned to correspond to the dimension of the water dispensing channels 24.

Figure 4:
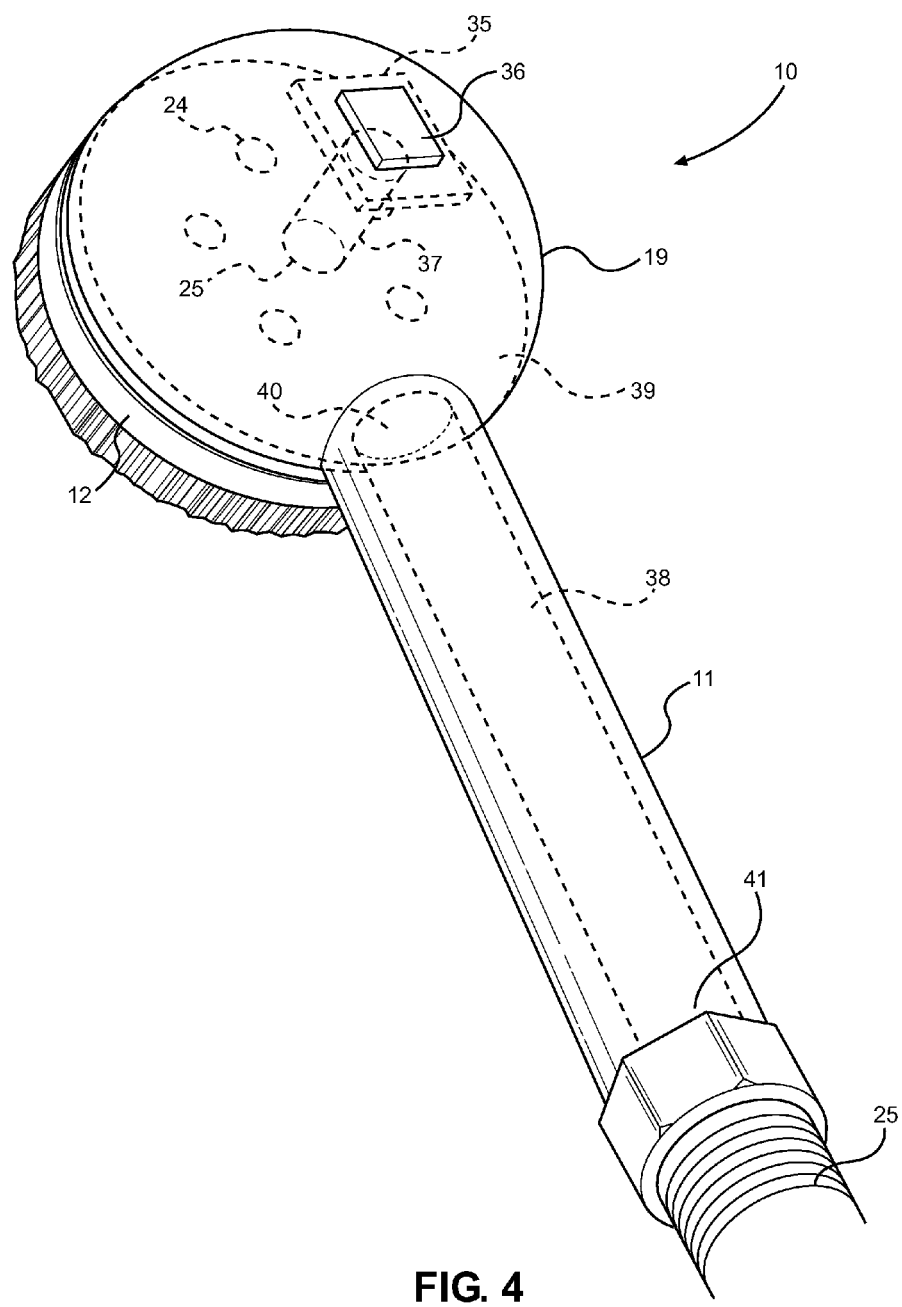
FIG. 4 shows a semi-transparent view of the shower brush.

Referring now to FIG. 4, there is a semi-transparent view of the shower brush. In the shown embodiment, the shower brush 10 includes a soap dispensing assembly and a water dispensing assembly. The soap dispensing assembly comprises a soap reservoir 35 formed within the brush head 19 of the shower brush 10. The soap reservoir 35 is configured to house liquid soap therein and may include a pouring hole through which liquid soap may be poured thereinto. A pump mechanism 36 is operably connected to the reservoir 35 so that when the pump mechanism 36 is actuated, the contents housed within the reservoir 35 is dispensed out of one or more soap dispensing channels 23 disposed on cleaning attachment 12. In the shown embodiment, a brush head tube 37 fluidly connects the reservoir 35 to the soap dispensing channel 23. In one embodiment, the pump mechanism 36 may be an actuatable button, whereby a user can selectively actuate the button and cause soap to be dispensed through one or more soap dispensing channels 23.

The water dispensing assembly comprises a hollow tubular member 38 disposed within the handle 11 of the shower brush 10 that is in fluid communication with the brush head 19 and one or more water dispensing channels 24. The hollow tubular member 38 comprises a first end and a second end, whereby the second end 41 is in fluid communication with a hose 25 or other water source via an attachment mechanism. The first end 40 of the hollow tubular member 38 is fluidly connected to a hollow interior volume 39 disposed within the brush head 19. The hollow interior volume 39 is configured to temporality house fluid, such as water, therein. The hollow interior volume 39 is in fluid communication with the water dispensing channels 24.

For example, the hose 25 is attached to a faucet whereby water flows from the faucet through the hose 25 and the hollow tubular member 38, whereby the water enters the hollow interior volume 39 of the brush head 19. The water then flows through the water dispensing nozzles 61 disposed on the cleaning attachment receiving portion 15 until the water is ultimately dispensed through the water dispensing channels 24 of the cleaning attachment 12.

Figure 5:
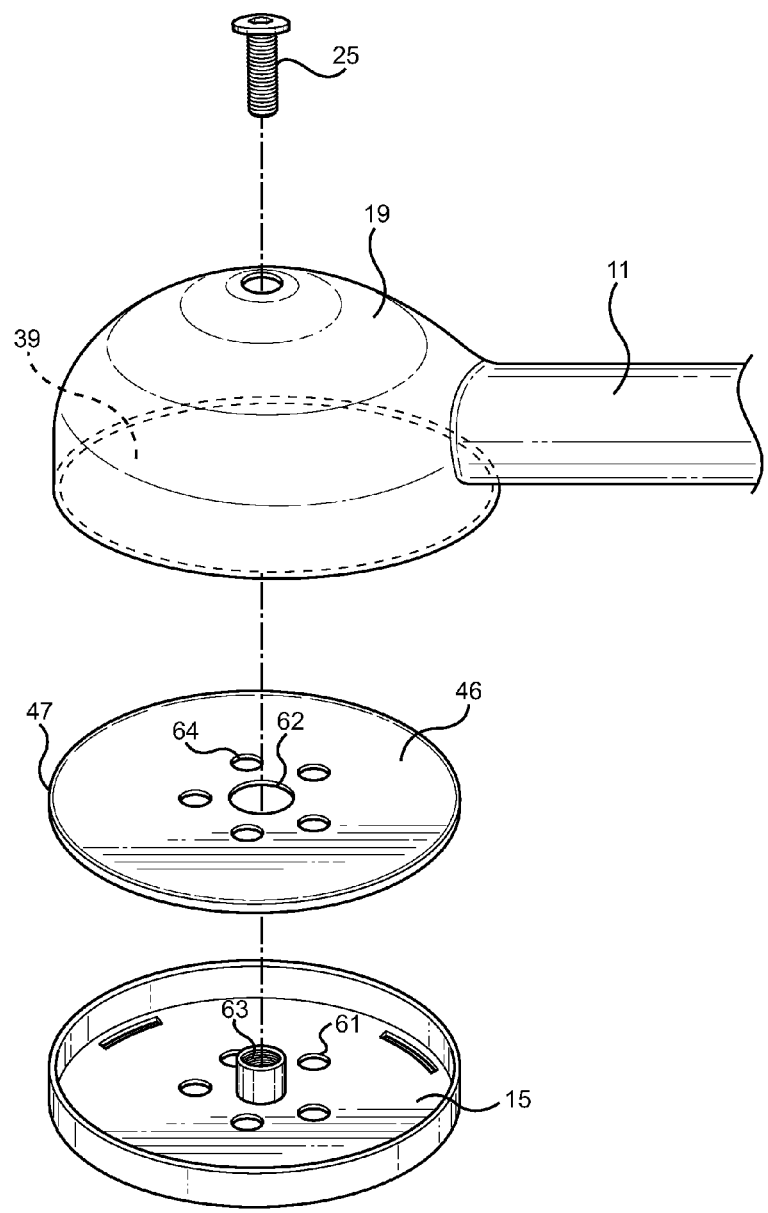
FIG. 5 shows an exploded view of the shower brush head and nozzle adjustment assembly.

Referring now to FIG. 5, there is an exploded view of the shower brush head and nozzle adjustment assembly. In the shown embodiment, the nozzle adjustment assembly comprises a fastener 45 that affixes the brush head 19 to the cleaning attachment receiving portion 15, whereby a shutter 46 is disposed therebetween. The brush head 19 includes an opening for receiving a fastener 45 therethrough. In the shown embodiment, the fastener is a male threaded screw that is configured to fasten to the cleaning attachment receiving portion 15. In the shown embodiment, the shower brush 10 lacks the soap dispensing assembly; however, the soap dispensing assembly may be used in conjunction with nozzle adjustment assembly.

The shutter 46 comprises a central aperture 62 configured to receive a fastener 45 therethrough and a plurality of apertures 64 configured to allow fluid to pass therethrough. In the shown embodiment, the shutter 46 is manually or automatically rotatable about the fastener 45. The plurality of apertures 64 are dimensioned to correspond with the dimensions of the water dispensing channels 24 and water dispensing nozzles 61 of the cleaning attachment receiving portion 15. In the shown embodiment, the shutter 46 is rotatable via manually grasping the edge 47 of the shutter 46 and applying a torque, or rotational force.

The shutter 46 may be selectively adjusted to be in an open, partially closed, or closed state. In an open state, the plurality of apertures 64 of the shutter 46 are aligned with the water dispensing nozzles 61 of the cleaning attachment receiving portion 15. Thus, fluid disposed within the hollow interior volume 39 of the brush head 19 flows substantially unobstructed through the nozzle adjustment assembly. In a partially closed state, the shutter 46 is rotated to partially obstruct the water dispensing nozzles 61 of the cleaning attachment receiving portion 15. Thus, in a partially closed state, fluid disposed within the hollow interior volume 39 of the brush head 19 flows though the water dispensing nozzles 61 of the cleaning attachment receiving portion 15 at a different flow rate and pressure than when in an open state. In operation, water or other fluid enters the interior volume of the brush head 19 from the handle 11, and is dispensed through the water dispensing nozzles 61 of the cleaning attachment receiving portion 15 according to the position of the shutter 46.

Figure 6:
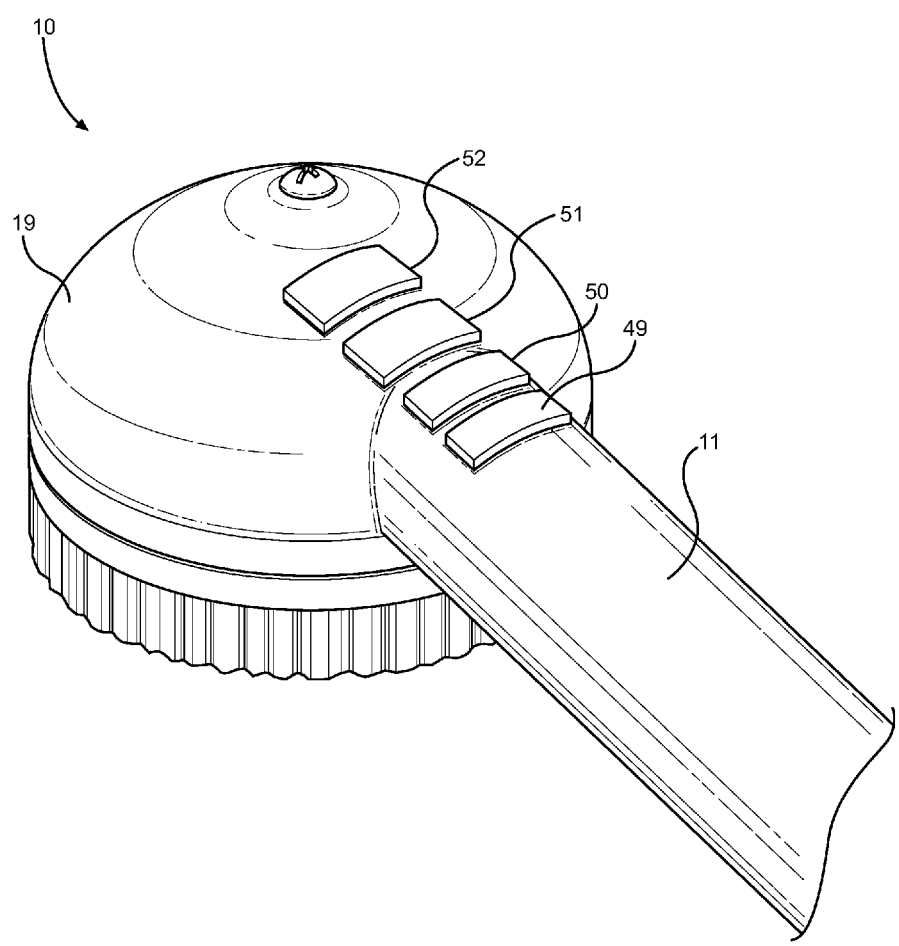
FIG. 6 shows an perspective view of the rear of the shower brush head and wireless sound system assembly.

Referring now to FIG. 6, there is a perspective view of the rear of the shower brush head and wireless sound system assembly. In some embodiments, the shower brush 10 utilizes a wireless speaker system, whereby the wireless speaker system wirelessly communicates with an electronic device via a wireless transceiver 50 and plays audio though one or more speakers 51 disposed on the shower brush 10. The wireless transceiver 50 may be operably connected to a control unit 52 having a microprocessor, whereby the microprocessor controls the operation of the wireless speaker system according to programmed instructions stored in a computer-readable medium. The control unit 52 further comprises push buttons or other control mechanisms, including but not limited to an on/off button and a volume increase/decrease button. A removable battery may be operably connected to the control unit and configured to provide electrical power to the wireless sound system assembly. In the shown embodiment, the wireless transceiver 50, the speakers 51, and the control unit 52 are disposed on the back side of the brush head 19 and handle 11 so that a user can operate the control unit 52 with one hand while grasping the handle 11 of the shower brush 10.

In the shown embodiment, the shower brush 10 includes a vibrating mechanism 49 disposed on the handle 11 or brush head 19, whereby the vibrating mechanism 49 is operably connected to the control unit 52. The vibration caused from the vibration mechanism 49 may can be a standard mechanism commonly used in vibrating devices. In one embodiment, the vibrating speed of the vibration mechanism 49 is adjustably controlled by an on/off and variable speed switch of the control unit 52. In the use of the vibrating mechanism 49 in one embodiment, the user actuates a push button of the control unit 52 that causes the vibration mechanism to activate.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shower brush, comprising:
an elongated handle having a first end and a second end;
a brush head disposed at said first end of said elongated handle, wherein said brush head comprises a cleaning attachment receiving portion;
a cleaning attachment removably engagable with said cleaning attachment receiving portion via a plurality of fasteners;
a water dispensing assembly having a flexible hose in fluid communication with one or more water dispensing channels;
wherein said flexible hose comprises a first end configured to affix said flexible hose to the second end of the elongated handle;
wherein said flexible hose comprises a second end configured to affix said flexible hose to a faucet, shower head, and the like via an attachment mechanism;
a soap dispensing assembly having a fluid reservoir in fluid communication with one or more soap dispensing channels;
wherein fluid from said reservoir is dispensed from said one or more soap dispensing channels via a pump mechanism;
wherein said one or more soap dispensing channels are disposed on said cleaning attachment; and
wherein said one or more soap dispensing channels are separate and independent from said one or more water dispensing channels.

2. The shower brush of claim 1, wherein said brush head further comprises:
a shutter assembly configured to adjust the spray pattern of one or more water dispensing nozzles comprising a shutter and the cleaning attachment receiving portion with one or more nozzles thereon.

3. A shower brush of claim 1, further comprising: a wireless sound system assembly comprising a wireless transceiver operably connected to a control unit and one or more speakers;
wherein said wireless transceiver is configured to communicate with an electronic device;
wherein said control unit comprises a microprocessor and control mechanisms configured to operate said wireless sound system assembly.

4. The shower brush of claim 1, wherein said elongated handle is extendable.

5. The shower brush of claim 1, wherein said plurality of fasteners is a plurality of twist lock mechanisms having a male connection mechanism disposed on the cleaning attachment configured to be received within a female connection mechanism disposed on the cleaning attachment receiving portion.

6. The shower brush of claim 1, further comprising: a vibrating mechanism operably connected to the control unit, wherein said vibrating mechanism is configured to vibrate said handle and said brush head.

7. The shower brush of claim 1, wherein said pump mechanism is activated via a manual pushbutton disposed on said elongated handle.

8. The shower brush of claim 1, including one or more water dispensing channels disposed in said cleaning attachment.

9. The shower brush of claim 1, further comprising a plurality of cleaning attachments.

10. A shower brush, comprising:
an elongated handle having a first end and a second end;
a brush head disposed at said first end of said elongated handle, wherein said brush head comprises a cleaning attachment receiving portion;
a cleaning attachment removably engagable with said cleaning attachment receiving portion via a plurality of fasteners;
a water dispensing assembly having a flexible hose in fluid communication with one or more water dispensing channels formed through said cleaning attachment receiving portion of said brush head;
wherein said flexible hose comprises a first end configured to affix said flexible hose to the second end of the elongated handle;
wherein said flexible hose comprises a second end configured to affix said flexible hose to a faucet, shower head, and the like via an attachment mechanism;
a soap dispensing assembly having a fluid reservoir in fluid communication with one or more soap dispensing channels formed through said cleaning attachment receiving portion;
wherein said one or more soap dispensing channels are separate and independent from said one or more water dispensing channels;
wherein fluid from said reservoir is dispensed from said one or more soap dispensing channels via a pump mechanism disposed on said elongated handle;
wherein said cleaning attachment includes one or more water receiving channels and one or more soap receiving channels;
wherein said one or more water receiving channels and said one or more soap-receiving channels in said cleaning attachment are respectively aligned with said water receiving and said soap-receiving channels of said brush head.

11. The shower brush of claim 10, including a single soap dispensing channel surrounded by a plurality of water dispensing channels.

12. The shower brush of claim 11, wherein said brush head further comprises:
a shutter assembly configured to adjust a spray pattern of one or more water dispensing nozzles comprising a rotatable shutter and the cleaning attachment receiving portion with one or more nozzles thereon;
said rotatable shutter including a plurality of water dispensing apertures corresponding to said water dispensing channels formed through said cleaning attachment receiving portion of said brush head, such that rotation of said shutter adjusts the flow of water and the spray pattern of said one or more water dispensing nozzles.

13. The shower brush of claim 10, wherein said pump mechanism is activated via a manual pushbutton disposed on said elongated handle.

14. The shower brush of claim 10, further comprising:
a wireless sound system assembly comprising a wireless transceiver operably connected to a control unit and one or more speakers;
wherein said wireless transceiver is configured to communicate with an electronic device;
wherein said control unit comprises a microprocessor and control mechanisms configured to operate said wireless sound system assembly.

15. The shower brush of claim 10, wherein said elongated handle is extendable.

16. The shower brush of claim 10, wherein said plurality of fasteners is a plurality of twist lock mechanisms having a male connection mechanism disposed on the cleaning attachment configured to be received within a female connection mechanism disposed on the cleaning attachment receiving portion.

17. The shower brush of claim 10, further comprising:
  a vibrating mechanism operably connected to the control unit, wherein said vibrating mechanism is configured to vibrate said handle and said brush head.

18. The shower brush of claim 10, further comprising a plurality of cleaning attachments.

\* \* \* \* \*